United States Patent [19]

DeCap

[11] Patent Number: 5,294,186
[45] Date of Patent: Mar. 15, 1994

[54] BOTTOM DUMP TRAILER

[76] Inventor: Camille DeCap, Box 535, Lafleche, Saskatchewan, Canada, S0H 2K0

[21] Appl. No.: 952,986

[22] Filed: Sep. 29, 1992

[51] Int. Cl.$^5$ .............................................. B60P 1/56
[52] U.S. Cl. .............................. 298/35 M; 222/545
[58] Field of Search ................. 105/249, 251; 222/503, 222/506, 545, 547; 298/1 V, 7, 32, 33, 35 M, 37

[56] References Cited

U.S. PATENT DOCUMENTS 5,131,722  7/1992  DeCap ............................ 298/35 M

Primary Examiner—Michael S. Huppert
Assistant Examiner—Janice Krizek
Attorney, Agent, or Firm—Adrian D. Battison; Stanley G. Ade; Murray E. Thrift

[57] ABSTRACT

A conventional bottom dump truck includes doors which in a closed position are suspended underneath the bottom opening of the hopper of the trailer. The doors are opened outwardly and upwardly by pivotal action about an upper suspension point of each of the doors. The amount of movement of the door is limited by an abutment member mounted upon a vertical flange on the outside surface of the hopper bottom. The abutment member includes an abutment plate extending outwardly from the flange together with a bracket which has a slot slidable along the length of the flange and locatable at different points along the length of the flange by a pin passing through openings in the bracket and one of a plurality of openings in the flange. The flange can be rotated about an axis longitudinal of the flange to move the abutment member out of the path of the abutment on the door and simultaneously to move a second abutment member into engagement with the door which is positioned at the maximum allowable opening of the door.

13 Claims, 4 Drawing Sheets

BOTTOM DUMP TRAILER

BACKGROUND OF THE INVENTION

This invention relates to a bottom dump trailer and particularly to an arrangement for controlling the amount of movement of at least one door of a bottom dump trailer for adjustment of the opening at the door.

Bottom dump trailers are well known and widely used for transportation of gravel and other pourable solids. One example of a trailer of this type is shown in U.S. Pat. No. 5,131,722 of the present applicant issued Jul. 21, 1992 and the present invention is an improvement over the arrangement shown in that patent. The trailer generally comprises a frame having ground wheels on the frame for transportation of the frame across the ground. A hopper is mounted on the frame with converging side walls which extend inwardly and downwardly to an open bottom of the hopper through which the pourable material can be dumped. Across the bottom on the outside is provided a pair of clam shell type doors which pivot about respective axes which are parallel and arranged above the opening so that in a closed position the doors abut at a central line of contact below the open bottom. A hydraulic cylinder is generally provided together with a control linkage which operates to move the doors simultaneously outwardly from the closed position so that the doors pivot outwardly and upwardly around the bottom edge of the hopper to define an opening between the doors through which the material can be dumped.

It is necessary in a device of this type to be able to adjust the size of the opening. Generally the hydraulic cylinder and linkage is arranged so that it simply moves the doors from the closed position to a wide open position at which the doors are halted either by the end of the stroke of the hydraulic system or by an engagement of the door with some part of the frame. It is however necessary in many cases to control this opening to a reduced width so that the dumping of the material takes place in a controlled manner to form a windrow as the trailer is moved forward.

SUMMARY OF THE INVENTION

It is one object of the present invention, therefore, to provide an improved trailer of the bottom dump type in which the opening between the doors can be adjusted more readily and more effectively.

According to the invention, therefore, there is provided a bottom dump trailer comprising a trailer frame, ground wheels for transportation of the frame across the ground, a hopper mounted on the frame for transportation of a pourable solid material including hopper sidewalls converging downwardly and inwardly to an open bottom of the hopper for discharge of the material through the open bottom, a door for opening and closing the open bottom including a door surface and means mounting the door surface suspended from the frame so as to be pivotal about an axis of movement offset from the door surface to one side thereof and arranged above said open bottom, the door thus being pivotally moveable from a first position, in which the door surface lies across an underside of the open bottom with a front edge of the door surface in contact with a closure member at a line of contact which is below the open bottom to a second position in which an opening is formed between said front edge and said closure member, drive means for moving said door outwardly from the first position toward a respective one of two opposed sides of the hopper, and means for halting said movement at a required position, said halting means comprising an abutment member, mounting means mounting said abutment member on a frame member adjacent a respective one of said opposed sides of the hopper, said door having abutment means thereon for engaging said abutment member and moveable in a path of movement as said door moves from the first position to the second position, said mounting means including means defining a plurality of selectable locations for the abutment member for engaging the abutment means at different points in its path of movement such that the amount of movement of the door from the first position can be adjusted for adjustment of the size of the opening and moving means for moving said mounting means such that the abutment member is moved out of the path of travel of the abutment means to allow the door to be moved to a maximum open position.

The abutment members are therefore located at a position on the side of the hopper which is readily accessible to the operator. In most cases the operator can simply walk to the side of the hopper and adjust the position of the abutment member. In the preferred embodiment described hereinafter, the abutment member can simply slide along a flange and can be located at the required position by passing a pin through the abutment member and through the flange. There is no necessity for the operator to crawl under the device or to guess the location and length of a chain.

In addition, the doors can simply be opened to the maximum position by moving the adjustment system out of the way and simultaneously moving a second abutment member at the maximum position into the path of the abutment on the door.

One embodiment of the invention will now be described in conjunction with the accompanying drawings in which:

DESCRIPTION OF THE DRAWINGS

In the drawings like characters of reference indicate corresponding parts in the different figures.

DETAILED DESCRIPTION

The following description relates closely to the embodiments shown in U.S. Pat. No. 5,131,722 of the present applicant and is included herein for completeness.

Figure 1:
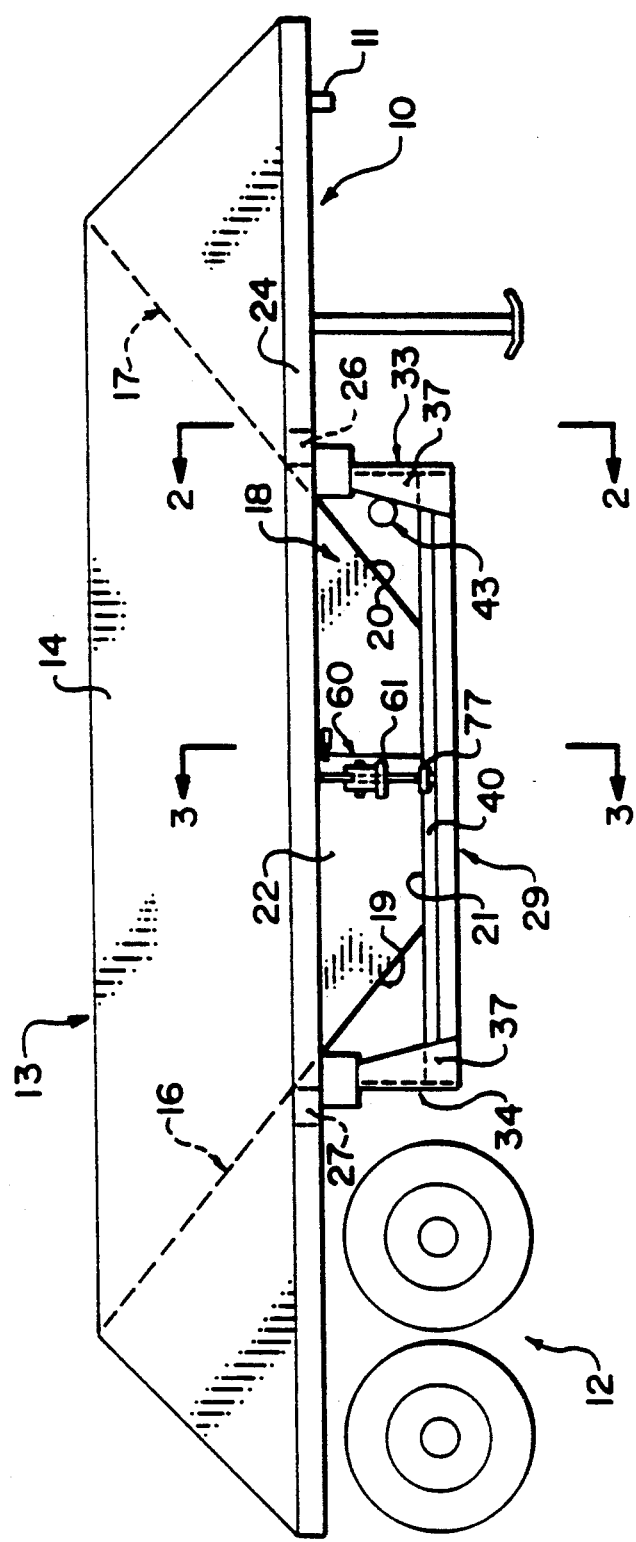
FIG. 1 is a side elevational view of a trailer according to the present invention.

A trailer is shown in FIG. 1 and comprises a main frame schematically indicated at 10 having a kingpin 11 at a forward end for attachment to a tractor vehicle and ground wheels 12 at a rearward end for transportation of the trailer across the ground. The main frame 10 carries a hopper generally indicated at 13 with side walls 14 and 15 and end walls 16 and 17. The end walls converge inwardly toward a central section to allow discharge of a pourable solid material to be transported within the hopper.

A hopper bottom section is generally indicated at 18 and includes end walls 19 and 20 acting as continuations of the end walls 16 and 17 so that they converge inwardly toward an open bottom 21 through which the material is to be discharged. The hopper bottom further includes side walls 22 and 23 which also converge inwardly toward the rectangular bottom opening 21 which lies in a horizontal plane and is bounded by the lowermost edges of each of the converging hopper bottom walls 19, 20, 22 and 23.

The main frame 10 includes a pair of longitudinal main beams 24 and 25 which extend along the full length of the trailer together with a plurality of cross beams one of which is shown at 26 and is positioned just forward of the hopper bottom and a similar cross beam 27 is positioned just rearward of the hopper bottom. Further frame beams can also be provided to give the necessary structural strength but are not shown for convenience of illustration.

Figure 3:
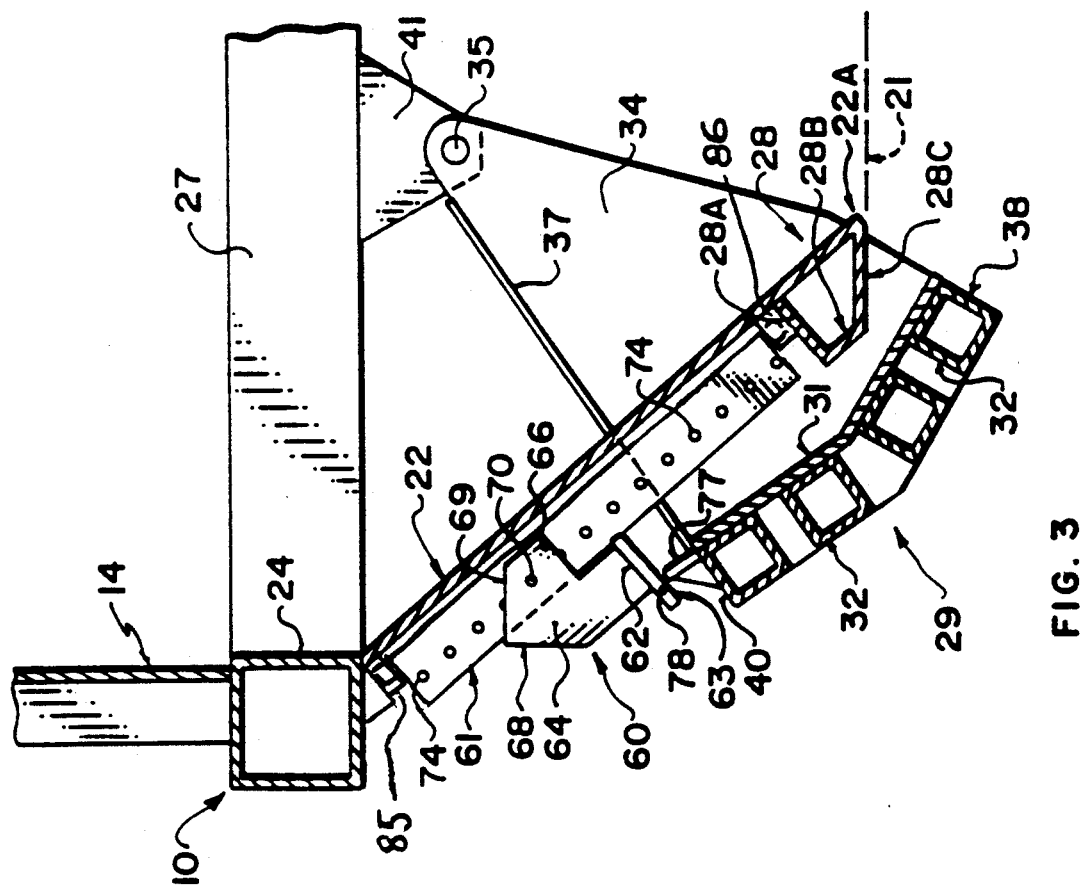
FIG. 3 is a view along the line 3—3 of FIG. 1 showing one half only of the bottom of the hopper for convenience of illustration.

As best shown in FIG. 3, the main longitudinal beam 24 projects outwardly from the side wall 14 of the hopper and also projects outwardly from the hopper bottom side wall 22. In addition to providing structural strength for the lowermost edge of the hopper bottom walls, a beam is provided at that lowermost edge and is defined by a fabricated channel 28 which is attached to the outer surface of the side wall at the lowermost edge indicated at 22A. The channel includes a flange 28A projecting outwardly from the side wall, a web 28B parallel to the side wall 22 and a lower most horizontal flange 28C extending from the lowermost edge of the web 28B to an apex at the lowermost edge 22A of the side wall 22.

Figure 2:
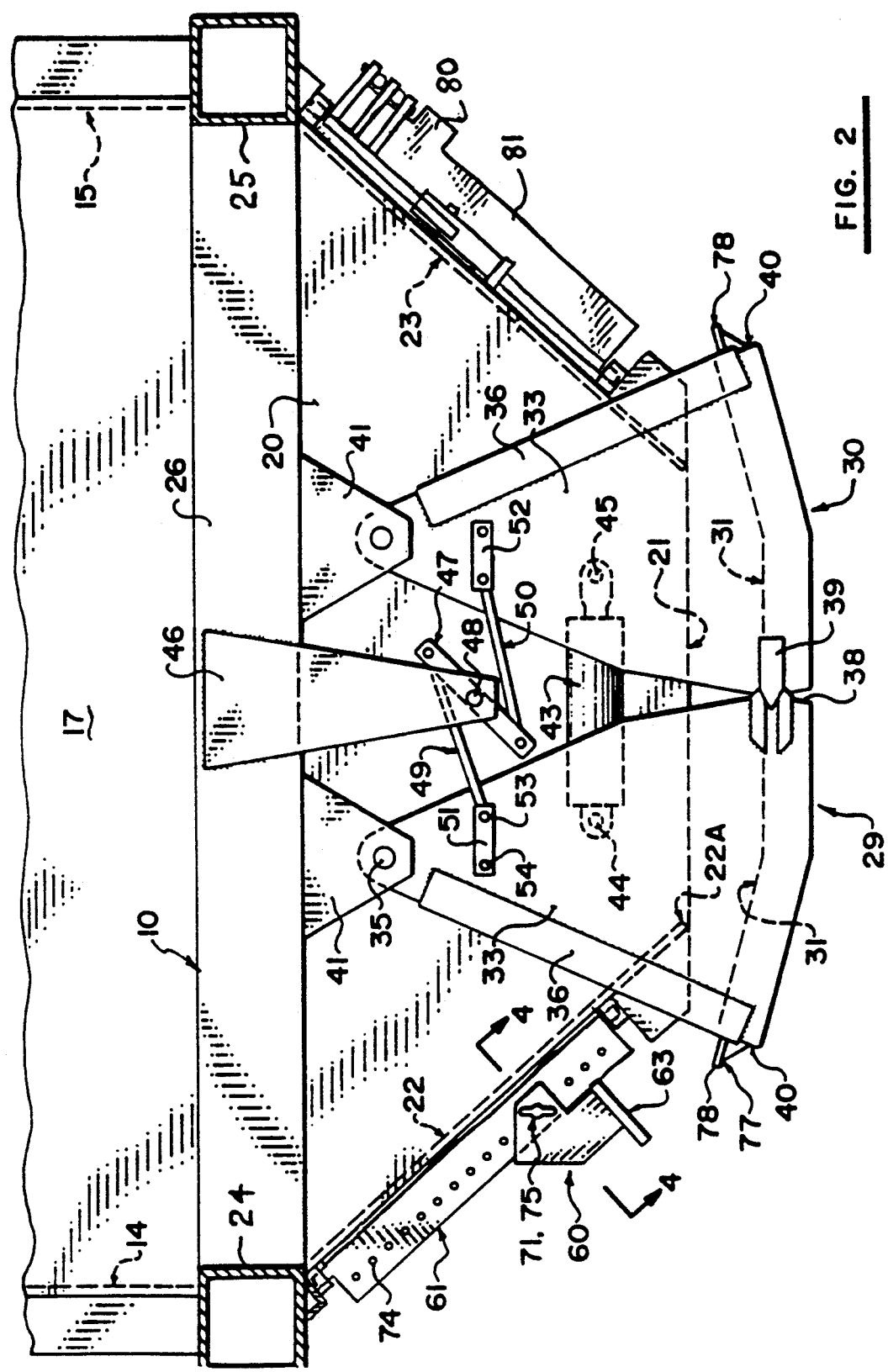
FIG. 2 is a view along the line 2—2 of FIG. 1.

In order to maintain the pourable solid material within the hopper when under transportation, a pair of doors is provided as indicated at 29 and 30 which cooperate generally in a claim sheet manner. Each of the doors comprises a door surface 31 onto which the material will fall to be supported by the door surface against further vertically downward movement. As shown in FIG. 3 the door surface is formed from a metal sheet which is supported by longitudinal beams 32. The longitudinal beams are attached to triangular end plates 33 and 34 which extend upwardly from the door surface to a pivot axle 35 positioned on the upper side of the door surface and generally symmetrically above the door surface to allow a pivotal action of the door surface about an axis offset from the door surface and arranged above the door surface as best shown in FIG. 2. The triangular end plates 33 and 34 are supported by stiffening ribs 36 and by side plates 37 to cradle the ends of the beams 32 and to provide a sufficiently rigid and strong frame to support the door surface 31 and the weight of the material carried thereby during the transportation mode.

As shown in FIG. 2, the doors each include a front edge 38 which in the closed position abut at a line of contact substantially symmetrically positioned centrally of the hopper bottom and longitudinally of the hopper bottom. A suitable strengthening guide element is provided at the line of contact to assist in preventing twisting of one door relative to the other in the closed position of the door against the relatively large forces provided by the material on the door surface. Each of the doors further includes an outermost edge 40 which of course is positioned outwardly of the edge 22A in the closed position shown in FIG. 2 so as to prevent the escape of material outwardly over the outer edge of the door. The position of the door relative to the edge 22A is arranged such that the repose angle of the material acts to keep the material restrained within the hopper bottom and above the door surfaces.

The axle 35 of each door is mounted upon a triangular support 41 carried on the main transverse beam 26 and depending therefrom. The axle is thus located above the opening 21 with each axle spaced equidistantly outwardly from the central line of contact but inwardly of the edge 22A.

Movement of the doors from the closed position shown in FIG. 2 is obtained by operation of a hydraulic cylinder 43 located in the space between the front wall 20 of the hopper bottom and the end plate 33 of the doors. The hydraulic cylinder 43 includes end couplings 44 and 45 connected respectively to the doors 29 and 30 so that expansion of the hydraulic cylinder causes the doors to move apart to an open position.

A control linkage is provided to ensure symmetrical movement of the doors as the doors are opened so that each door moves from a closed position towards an open position by an equal amount. The control linkage is supported from a bracket 46 positioned on a centre line of the trailer and depending downwardly between the two supports 41. The bracket carries a first lever 47 which is pivotal about an axle 48 carried at a lower end of the bracket 46. The lever extends outwardly from each side of the axle 48 to define an upper and a lower part with the upper part connected to the door 29 by a rod 49 and a lower part connected to the door 30 by a rod 50. Each of the rods connects to a link 51 and 52 respectively. The link 51 is pivotally coupled to the rod 49 at a pivot axis 54. The amount of movement of the link is limited. As the doors are thus moved apart, the cooperation between the control rods 49 and 50 and the central lever 47 ensures that the doors move symmetrically.

The amount of movement of each of the doors is controlled by an abutment member generally indicated at 60. Each of the doors 29 and 30 has a respective one of a pair of the abutment members 60. The abutment member 60 can be adjusted in position inwardly and outwardly to limit the amount of movement of the doors to a required position so as to adjust to a required dimension the opening between the doors through which the material is deposited.

Each of the abutment members 60 is mounted upon a flange 61 which lies in a vertical plane and extends as best shown in FIG. 3 from the main beam 24 to the lower support beam 28. The mounting of the flange 61 is described in detail hereinafter. The flange 61 projects out to a distance approximately equal to the width of the flange 28A.

The abutment member 60 includes an abutment plate 62 which is supported so that it extends outwardly from the flange 61 generally at right angles thereto and defines a lower surface 63 providing an abutment surface for engaging the outer edge of the door in the open position. The abutment plate 62 is supported in position by a support bracket 64 mounted upon the flange 61. The bracket 64 includes a pair of projecting portions 65 and 66 which extend toward the flange 61 in a sliding action between the projecting portions. The projecting portions extend partway across the width of the flange and over a length sufficient to hold the bracket in place on the flange without twisting. From a projecting portion 65 and 66, the bracket extends outwardly from the flange and slightly longitudinally of the flange from the projecting portions to be connected to the abutment plate 62 at a position spaced downwardly from the projecting portions. The edges 68 and 69 of the bracket are chamfered to provide a pleasing appearance of the element defining the bracket. The bracket has an opening 70 therethrough passing through the projecting portions 65 and 66 to receive a pin 72 in a locking action of the bracket on the flange. The flange thus includes a plurality of openings 74 at spaced positions along the length of the flange and at a position spaced from the edge of the flange sufficient that the base of the slot in the bracket lies along the outermost edge of the flange when the pin 72 is located through the openings. The pin includes a T-bar handle 75 at one end and a nut 76 at the other end which can be threadedly engaged with a screw thread on the pin to clamp the nut and T-shaped handle against sides of the projecting portions to hold the bracket securely in place on the flange at the required location.

The outer edge 40 of the door carries a projecting plate 77 which has an outer abutment surface 78 for engaging against the surface 63 of the abutment plate 62 in the abutting action shown in FIG. 3. The edge of the plate 78 provides the abutting action against the surface 63 so that the width of the edge 78 is significantly less than the width of the plate 63. This provides a constant and effective abutting action despite the fact that the position of abutment moves longitudinally of the plate 62 as the bracket is moved longitudinally of the flange 61.

In operation, the operator of the vehicle can readily adjust the amount of movement of the door on each side of the vehicle from the closed position to a required open position. The required spacing between the doors in the open position will vary depending upon the particular usage of the vehicle and the material being transported. The adjustment in the device described can be effected with the doors in the closed position simply by the operator removing the pin 71 from the opening the bracket and sliding the bracket upwardly or downwardly along the flange 61 to the required location. The pin is then replaced in the opening 70 to hold the bracket in position. A single pin is sufficient in view of the effective holding action of the bracket on the flange provided by the slot and the engagement of the base of the slot with the outer edge of the flange. The adjustment can be effected simply by the operator standing adjacent the side of the vehicle without the necessity to crawl under the vehicle or to reach to parts of the vehicle which may have become dirtied by engagement with the material. The operation is therefore clean and efficient.

The above described arrangement is shown in the above U.S. Pat. No. 5,131,722 of the present applicant. The arrangement of the present invention is modified by the mounting of the flange 61 in a manner which allows movement of that flange and the mounted abutment member 60 from the initial operating position projecting outwardly to the side of the hopper to a retracted position turned at 90° thus moving the abutment member out of the path of the abutment 78 on the door. At the same time a second abutment member 80 is moved into position to engage the abutment 78 on the door, the second abutment member being positioned at a location relative to the door which defines the maximum opening position of the door.

Figure 4:
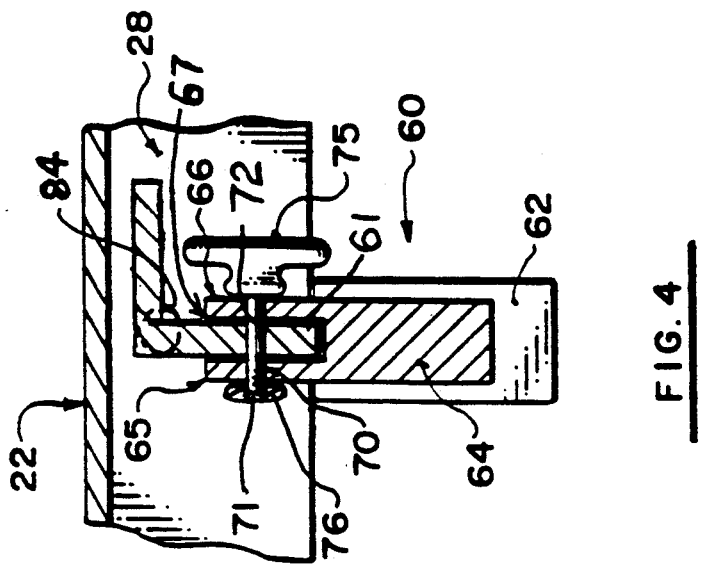
FIG. 4 is a cross-sectional view along the line 4—4 of FIG. 2.
Figure 5:
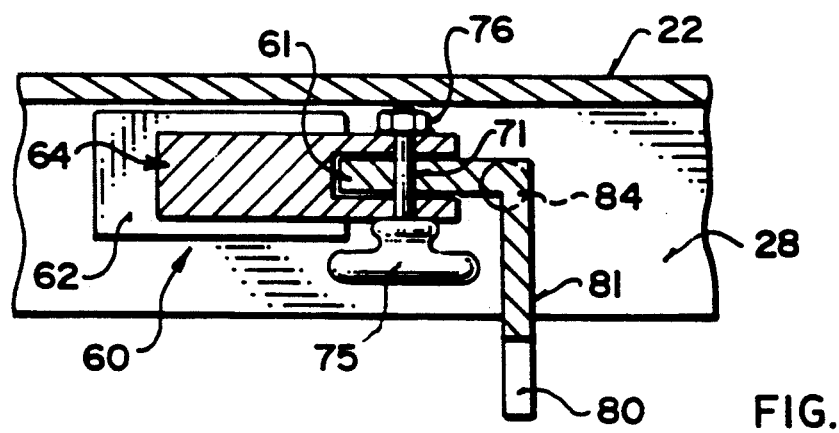
FIG. 5 is a view similar to that of FIG. 4 showing the adjustment system moved away from the path of travel of the abutment on the door.
Figure 6:
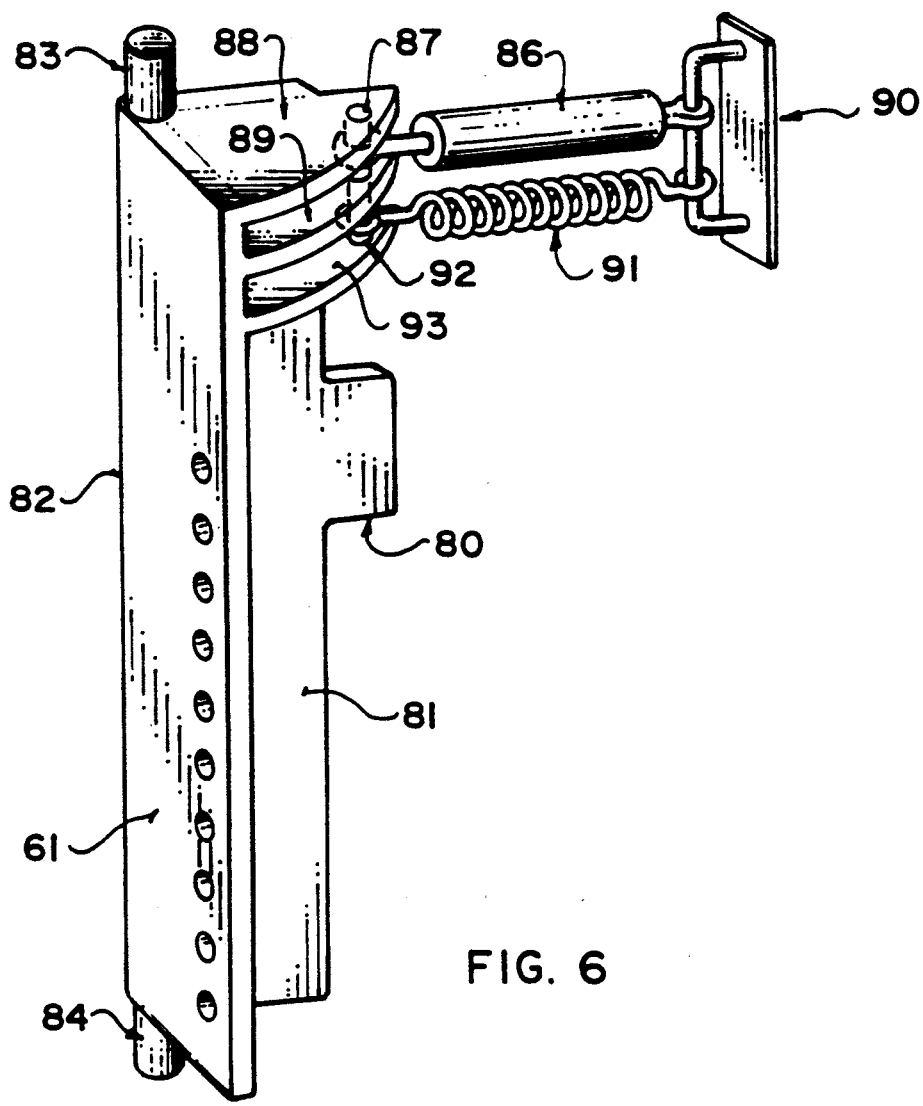
FIG. 6 is an isometric view of the adjustment system only of FIGS. 1, 2, 3, 4 and 5.

Thus as best shown in FIGS. 4, 5 and 6, the flange 61 forms part of a right angle flange arrangement including a second flange 81. The flanges 61 and 81 are coextensive and are arranged at right angles connected along an apex 82. At or adjacent the apex is mounted a pair of longitudinally extending pins 83 and 84 which define a rotation axis of the flange arrangement about the axis of the pins. As shown in FIG. 3, each of the pins is received in a sleeve shaped receptacle 85, 86 suitably mounted at the top and bottom rails of the hopper. The sleeves thus hold the flange arrangement in place adjacent the side wall of the hopper and allow rotation of the flange arrangement about the longitudinal axis of the flange arrangement as defined by the pins and the coaxial sleeves.

In normal operating position of the device, the flange 61 is arranged at right angles to the side wall of the hopper projecting outwardly therefrom and carrying the abutment member 60. In this position, as explained above, the abutment member acts to control the movement of the doors to the required open position.

When it is required to open the doors to the maximum extent to ensure that the load is fully discharged, the flange arrangement is simply pivoted about the longitudinal axis so as to turn the flange arrangement to the position shown in FIG. 5 in which the flange 61 lies parallel to the sidewall of the hopper and the flange 81 is turned to a position at right angles to the side wall of the hopper. In this position the second abutment member 80 is moved to a position projecting directly outwardly from the side of the hopper for engaging the abutment 78 of the door. This position is shown on the right hand side of the hopper in FIG. 2.

The movement is actuated by an air cylinder 86 extending from a pivot coupling 87 mounted between a pair of horizontal plates 88 and 89 connected to the flange arrangement. An outer end of the air cylinder is attached to a suitable mounting bracket generally indicated at 90 and carried on a suitable location on the hopper. In order to provide a controlled actuation of the movement using a simple air cylinder, a spring 91 is provided similarly extending from the bracket 90 to a pivot coupling 92 between the plate 89 and a third plate 93. The air cylinder 86 can thus comprise a single acting cylinder with the spring 91 providing a bias of the flange arrangement back to the normal or initial position. The spring also restricts the movement so that a simple regulation of the air supply to the cylinder can be used against the bias of the spring to gradually move the flange arrangement to the second position.

Thus when the operator wishes to open doors to the maximum position, it is simply necessary to actuate the air cylinder 86 to move the flange arrangement to the second position while the doors are moved to the closed position. The doors can then be reopened and moved to the maximum open position to ensure complete discharge. When the doors are again closed, the cylinder 86 can be retracted by the release of the air pressure and the return bias of the spring so that the set or adjusted abutment member 60 is again returned to its operating position.

Since various modifications can be made in my invention as herein above described, and many apparently widely different embodiments of same made within the spirit and scope of the claims without departing from such spirit and scope, it is intended that all matter contained in the accompanying specification shall be interpreted as illustrative only and not in a limiting sense.

I claim:

1. A bottom dump trailer comprising a trailer frame, ground wheels for transportation of the frame across the ground, a hopper mounted on the frame for transportation of a pourable solid material including hopper sidewalls converging downwardly and inwardly to an open bottom of the hopper for discharge of the material through the open bottom, a door for opening and closing the open bottom including a door surface and means mounting the door surface suspended from the frame so as to be pivotal about an axis of movement offset from the door surface to one side thereof and arranged above said open bottom, the door thus being pivotally movable from a first position, in which the door surface lies across an underside of the open bottom with a front edge of the door surface in contact with a closure member at a line of contact which is below the open bottom to a second position in which an opening is formed between said front edge and said closure member, drive means for moving said door outwardly from the first position toward one of two opposed sides of the hopper, and means for halting said movement at a required position, said halting means comprising an abutment member, mounting means mounting said abutment member on a frame member adjacent a respective one of said opposed sides of the hopper, said door having abutment means thereon for engaging said abutment member and movable in a path of movement as said door moves from the first position to the second position, said mounting means including means defining a plurality of selectable locations for the abutment member for engaging the abutment means at different points in its path of movement such that the amount of movement of the door from the first position can be adjusted for adjustment of the size of the opening and moving means for moving said mounting means such that the abutment member is moved out of the path of travel of the abutment means to allow the door to be moved to a maximum open position.

2. A trailer according to claim 1 wherein the abutment member comprises a surface lying in plane projecting outwardly from a side of the hopper and wherein said abutment means comprises a member mounted on an edge of the door remote from the front edge and arranged for engagement with the surface, the surface and the abutment means being arranged to provide contact therebetween with the position of the contact varying in dependence upon the location selected from said plurality of locations.

3. A trailer according to claim 2 wherein said member on the door includes an abutment edge which has a width which is comparatively narrow relative to a width of said surface in a direction projecting outwardly from the side of the hopper.

4. A trailer according to claim 1 wherein said mounting means includes a pin and wherein said abutment member incudes an opening therein for receiving the pin and wherein said means defining a plurality of selectable locations comprises an elongate member extending in a substantially vertical plane along the respective side wall of the hopper, the elongate member having a plurality of openings therein each for receiving the pin such that the pin can locate the abutment member at a respective one of the openings in the elongate member.

5. A trailer according to claim 4 wherein the elongate member comprises a flange lying in a vertical plane and extending outwardly from the side wall of the hopper.

6. A trailer according to claim 5 wherein the abutment member includes a slot therein such that portions of the abutment member straddle the flange with the flange lying in the slot, the elongate member opening extending through the portions for receiving the pin passing through the portions and through the flange.

7. A trailer according to claim 6 wherein the surface is provided on a plate welded on an underside of the portions and projecting outwardly from the flange.

8. A trailer according to claim 1 wherein there is provided a second abutment member, and wherein said moving means is arranged to move said second abutment member into the path of travel of the abutment means for engagement of said abutment means with said second abutment member at the maximum open position.

9. A trailer according to claim 1 wherein the moving means is arranged to move the mounting means such that the abutment means is moved transversely of the path of travel.

10. A trailer according to claim 9 wherein the moving means is arranged to rotate the mounting means about an axis generally parallel to the path of travel.

11. A trailer according to claim 8 wherein the moving means is arranged to move said second abutment member into the path of travel of the abutment means simultaneously with movement of said abutment member.

12. A trailer according to claim 1 wherein the mounting means comprises an elongate flange member extending generally along the path of travel and defining a plurality of openings therethrough at spaced positions along the length thereof, mounting means including a pin for engaging a selected one of the openings to locate the abutment member at a selected position along the length of the flange member, and wherein the moving means comprises means for rotating the flange member about an axis longitudinal thereof.

13. A trailer according to claim 1 wherein the mounting means comprises an elongate flange member extending generally along the path of travel and defining a plurality of openings therethrough at spaced positions along the length thereof, the mounting means including a pin for engaging a selected one of the openings to locate the abutment member at a selected position along the length of the flange member, and wherein the moving means comprises means for rotating the flange member about an axis longitudinal thereof, wherein said moving means is arranged to move a second abutment member into the path of travel of the abutment means for engaging said abutment member at the maximum open position, and wherein the second abutment member is mounted on a second flange member arranged at right angles to said flange member such that movement of the flange member and the second flange member about said axis through 90° moves the second abutment member into the path of travel of the abutment means.

* * * * *